United States Patent
Lin et al.

(10) Patent No.: US 7,108,578 B2
(45) Date of Patent: Sep. 19, 2006

(54) SYSTEM AND METHOD FOR MANUFACTURING MAGNETIC HEADS

(75) Inventors: Huihui Lin, Los Gatos, CA (US); Kenneth Mackay, San Jose, CA (US); David Seagle, Morgan Hill, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/986,733

(22) Filed: Nov. 12, 2004

(65) Prior Publication Data

US 2006/0105677 A1    May 18, 2006

(51) Int. Cl.
  *B24B 7/22*  (2006.01)
(52) U.S. Cl. .............................................. 451/5; 451/8
(58) Field of Classification Search ..................... 451/5, 451/1, 8, 10, 36, 37; 29/603.15, 603.16
See application file for complete search history.

(56) References Cited

U.S. PATENT DOCUMENTS

| | | | |
|---|---|---|---|
| 4,912,883 A * | 4/1990 | Chang et al. .................. 451/1 |
| 5,214,589 A * | 5/1993 | Tang .......................... 700/117 |
| 5,222,329 A * | 6/1993 | Yu .............................. 451/11 |
| 5,245,794 A * | 9/1993 | Salugsugan .................. 451/10 |
| 5,439,551 A * | 8/1995 | Meikle et al. ................. 438/5 |
| 5,463,805 A * | 11/1995 | Mowry et al. ........... 29/603.09 |
| 5,632,669 A | 5/1997 | Azarian et al. |
| 5,772,493 A | 6/1998 | Rottmayer et al. |
| 5,885,131 A | 3/1999 | Azarian et al. |
| 6,083,081 A | 7/2000 | Fukuroi et al. |
| 6,170,149 B1 | 1/2001 | Oshiki et al. |
| 6,261,165 B1 * | 7/2001 | Lackey et al. .............. 451/387 |
| 6,424,137 B1 * | 7/2002 | Sampson .................. 324/76.21 |
| 6,538,430 B1 | 3/2003 | Carrington et al. |
| 6,732,421 B1 | 5/2004 | Gates et al. |
| 6,857,937 B1 * | 2/2005 | Bajorek .......................... 451/5 |
| 2003/0026046 A1 | 2/2003 | Yamakura et al. |
| 2003/0220050 A1 | 11/2003 | Bunch et al. |

FOREIGN PATENT DOCUMENTS

| JP | 3049004 | 3/1991 |
| JP | 10269530 | 10/1998 |

OTHER PUBLICATIONS

Satoru Araki, et al. "Fabrication and Electric Properties of Lapped Type of TMR Heads for ~50Gb/in2 and Beyond" IEEE Mag-38 n.1, pp. 72ff.
R. Simmons, et al. "Anisotropy Changes in Magnetoresistive Heads Due to Lapping and Annealing" IEEE Mag-25 n.5, pp.3200ff.
US 5,772,943, 06/1998, Rottmayer et al. (withdrawn)*

* cited by examiner

*Primary Examiner*—Robert A. Rose

(57) ABSTRACT

Systems and methods for the manufacture of a magnetic head. A first embodiment provides an apparatus for the manufacture of a magnetic head comprising a feedback control loop to terminate lapping of the magnetic head responsive to achieving a target signal to noise ratio for the magnetic head.

19 Claims, 2 Drawing Sheets

SYSTEM AND METHOD FOR MANUFACTURING MAGNETIC HEADS

TECHNICAL FIELD

Embodiments of the present invention relate to the fields of manufacturing semiconductors and hard disk drives, and more particularly to systems and methods for manufacturing magnetic heads as utilized in hard disk drives and other magnetic media.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model includes a plurality of storage disks or hard disks vertically aligned about a central core that spin at a standard rotational speed. A plurality of magnetic read/write transducer heads, for example, one head per surface of a disk, is mounted on the actuator arm. The actuator arm is utilized to reach out over the disk to or from a location on the disk where information is stored. The complete assembly, e.g., the arm and head, is known as a head gimbal assembly (HGA).

In operation, the plurality of hard disks is rotated at a set speed via a spindle motor assembly having a central drive hub. Additionally, there are channels or tracks evenly spaced at known intervals across the disks. When a request for a read of a specific portion or track is received, the hard disk drive aligns a head, via the arm, over the specific track location and the head reads the information from the disk. In the same manner, when a request for a write of a specific portion or track is received, the hard disk drive aligns a head, via the arm, over the specific track location and the head writes the information to the disk.

Over the years, refinements of the disk and the head have provided great reductions in the size of the hard disk drive. For example, the original hard disk drive had a disk diameter of 24 inches. Modern hard disk drives are generally much smaller and include disk diameters of less than 2.5 inches (micro drives are significantly smaller than that).

The recording or read/write heads of modern hard disk drives do not actually make contact with the recording media. Rather the heads "fly" on a cushion of air generated by the relative motion of the head over a rapidly spinning platter or disk comprising the recording media. The ability of a head to fly at a desirable height is a critical performance aspect of hard disk drives. Such flying heads are generally referred to or known as "sliders." As recording density increases, the slider flying height, e.g., the distance between a slider and a recording media surface, generally decreases. Such decreases in flying height typically require ever flatter slider surfaces. A lapping process typically determines a flatness characteristic of a slider.

A wafer is a basic "building block" upon which numerous processing actions take place to produce multiple components. Wafers also form a similar building block for the production of magnetic read and/or write heads ("sliders") as used in hard disk drives. The production of such devices can comprise many different processing steps. It is not uncommon for hundreds of operations to be performed on wafers to produce magnetic heads.

In recording head technology, the volume or size of the recording sensor is very small. For example, modern recording sensors are of the order of 100 nm. Typically, such sensors become ever smaller with successive generations of hard drive technology. In general, such heads are so small that each sensor has unique signal and noise characteristics due to individual microstructure, milling and lapping surface conditions. For example, removing a few nanometers of material from a reading sensor during a lapping process can dramatically affect various operational characteristics of a head, e.g., resistance, signal amplitude and/or signal to noise ratio.

In a conventional head manufacturing process, a head or set of heads is lapped to establish surface quality and a target sensor stripe height. Unfortunately, lapping to a well controlled target stripe height produces an undesirably broad distribution of amplitude and drive performance results from such conventional head manufacturing processes.

Accordingly, there is a need for systems and methods for manufacturing magnetic heads. Additionally, in conjunction with the aforementioned need, systems and methods for manufacturing magnetic heads that account for unique signal and noise characteristics of individual magnetic heads are desired. A further need, in conjunction with the aforementioned needs, is for manufacturing magnetic heads in a manner that is compatible and complimentary with existing magnetic head processing systems and manufacturing processes.

SUMMARY

Systems and methods for the manufacture of a magnetic head are disclosed. A first embodiment provides an apparatus for the manufacture of a magnetic head comprising a feedback control loop to terminate lapping of the magnetic head responsive to achieving a target signal to noise ratio for the magnetic head.

BEST MODES FOR CARRYING OUT THE INVENTION

Figure 1:
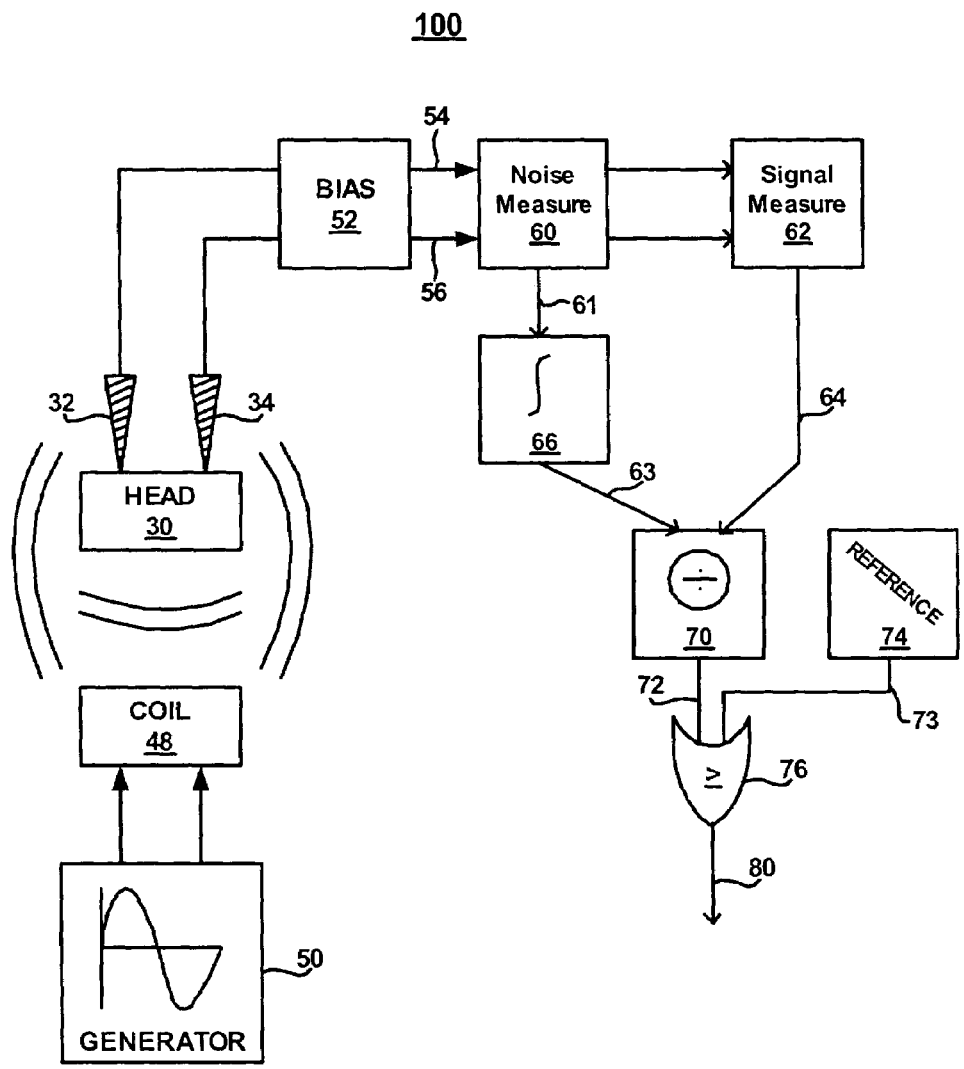
FIG. 1 illustrates a functional block diagram of an apparatus for the manufacture of a magnetic head, in accordance with embodiments of the present invention.

Reference will now be made in detail to the alternative embodiment(s) of the present invention, system and method for manufacturing magnetic heads. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Some portions of the detailed descriptions that follow (e.g., method 200) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "placing" or "moving" or "determining" or "calculating" or "delaying" or "measuring" or "terminating" or "initiating" or "locating" or "indicating" or "transmitting" or "receiving" or "advancing" or "comparing" or "processing" or "computing" or "translating" or "determining" or "excluding" or "displaying" or "recognizing" or "generating" or "assigning" or "initiating" or "collecting" or "transferring" or "switching" or "accessing" or "retrieving" or "receiving" or "issuing" or "measuring" or "conveying" or "sending" or "dispatching" or "advancing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

SYSTEM AND METHOD FOR MANUFACTURING MAGNETIC HEADS

FIG. 1 illustrates a functional block diagram of an apparatus 100 for the manufacture of a magnetic head, in accordance with embodiments of the present invention. Magnetic heads, e.g., head 30, are typically manufactured via well-known thin-film processing techniques. In general, a large number of magnetic heads are produced on a wafer in a fashion similar to semiconductor manufacturing. For example, numerous processing steps, including, e.g., depositions, heating, etching, coating and the like, are completed on a wafer. Subsequently, a wafer is typically subdivided into rows or bars that typically are one head assembly wide by many wafers long. In general, some late process manufacturing operations, e.g., a bulk electronic lapping, are performed upon bars of head assemblies. In addition, some testing is usually also performed upon such bars, e.g., to identify defects. In a subsequent operation, the bars are cut or diced apart into individual head assemblies or "dice."

In accordance with embodiments of the present invention, head 30 is typically a single head assembly. For example, head 30 has been separated from a wafer and/or a bar. Head 30 is typically placed in a head or die carrier and placed in a well-known lapping apparatus. For example, head 30 in a die carrier is held via an arm against a rotating lapping plate. The arm holds head 30 against the lapping plate such that one face of head 30 is pushed against the lapping plate. Slider materials are removed at a desired rate determined, in part, by the force applied to the slider and the rotational speed of the lapping plate. A lapping process can be terminated by either moving a slider away from a lapping plate or ceasing the motion of the lapping plate. The well known lapping apparatus is not shown in FIG. 1 so as not to obscure other elements of the present embodiment.

While head 30 is being lapped in a lapping apparatus, head 30 is subjected to a quasi-static magnetic field generated by signal generator 50 and transmitted by coil 48. Embodiments in accordance with the present invention are well suited to a wide range of frequencies for the quasi-static magnetic field. In general, the quasi-static magnetic field can oscillate at a frequency substantially less than a range of frequencies that head 30 would experience corresponding to reading or writing data in its intended application, e.g., in a hard disk drive. For example, signal generator 50 can generate a signal of about 100 Hz. In contrast, in operation within a hard disk drive, head 30 would typically detect frequencies of hundreds of megahertz to a few gigahertz. By utilizing substantially lower frequencies, instrumentation, e.g., detectors, amplifiers and cabling, of manufacturing apparatus 100 can be advantageously less complex than otherwise required.

A head biasing circuit 52 is coupled to head 30 through probes 32 and 34. Head biasing circuit 52 provides a biasing voltage (current) necessary for proper operation of head 30 and to sense changes in the voltage drop across head 30.

Head 30 output signals 54 and 56 comprise signal components representing the time-varying signal produced by signal generator 50, as well as broadband noise characteristic of head 30. Head 30 output signals 54 and 56 are coupled to noise measurement circuitry 60 and signal measurement circuitry 62, generally in an electrically parallel arrangement. Noise measurement circuitry 60 produces an output noise signal 61, characteristic of noise in head 30 output signals 54 and 56. In general, it is not useful to measure more than about the first 50 MHz, e.g., 0–50 MHz, of noise bandwidth. It is to be appreciated that utilizing a noise bandwidth of greater than about 50 MHz generally does not provide additional benefit. In contrast, there are numerous deleterious impacts, e.g., in instrumentation, associated with attempts to utilize much higher noise bandwidths.

Output noise signal 61 is optionally further processed by noise integration circuitry 66 to produce integrated noise signal 63. Signal measurement circuitry 62 produces a signal measured signal 64, characteristic of a signal in head 30 output signals 54 and 56.

Signal measured signal 64 and integrated noise signal 63 (alternatively output noise signal 61), are combined in divider 70 to produce signal to noise ratio signal 72. It is to be appreciated that signal to noise ratio signal 72 corresponds to a substantially real time signal to noise ratio of head 30 while head 30 is being lapped.

Signal to noise ratio signal 72 is compared to a reference signal to noise ratio signal 73 produced by reference signal generator 74. Reference signal noise ratio 73 represents a minimum acceptable signal to noise ratio for head 30.

Comparator 76 compares an actual signal to noise ratio, e.g., signal to noise ratio signal 72, to a reference signal to noise ratio, e.g., reference signal to noise ratio signal 73, and produces terminate lapping signal 80 if an actual signal to noise ratio is greater than or equal to a reference signal to noise ratio. Responsive to terminate lapping signal 80, lapping of head 30 is terminated.

For example, during lapping, various operational characteristics of a head, e.g., resistance, signal amplitude and/or signal to noise ratio, can vary dramatically. Further, in general, such variations can be non-monotonic, e.g., the characteristics change in different directions. When a signal to noise ratio of a head reaches an acceptable level, as determined by comparing its signal to noise ratio to a reference signal to noise ratio, lapping is terminated. Thus, in accordance with embodiments of the present invention, heads are lapped until a target signal to noise ratio is achieved, in contrast to conventional art practices of lapping to achieve a particular target stripe height.

It is to be appreciated that embodiments in accordance with the present invention are well suited to variations of the circuitry shown in FIG. 1. More particularly, alternative embodiments can comprise digital components, e.g., a microprocessor. For example, a microprocessor can perform a comparison operation to determine if a present signal to noise ratio of a head being lapped is greater than or equal to a reference signal to noise ratio. Embodiments in accordance with the present invention are further well suited to systems and techniques of digital signal processing and/or numerical determinations of noise, signal and/or signal to noise ratios.

Figure 2:
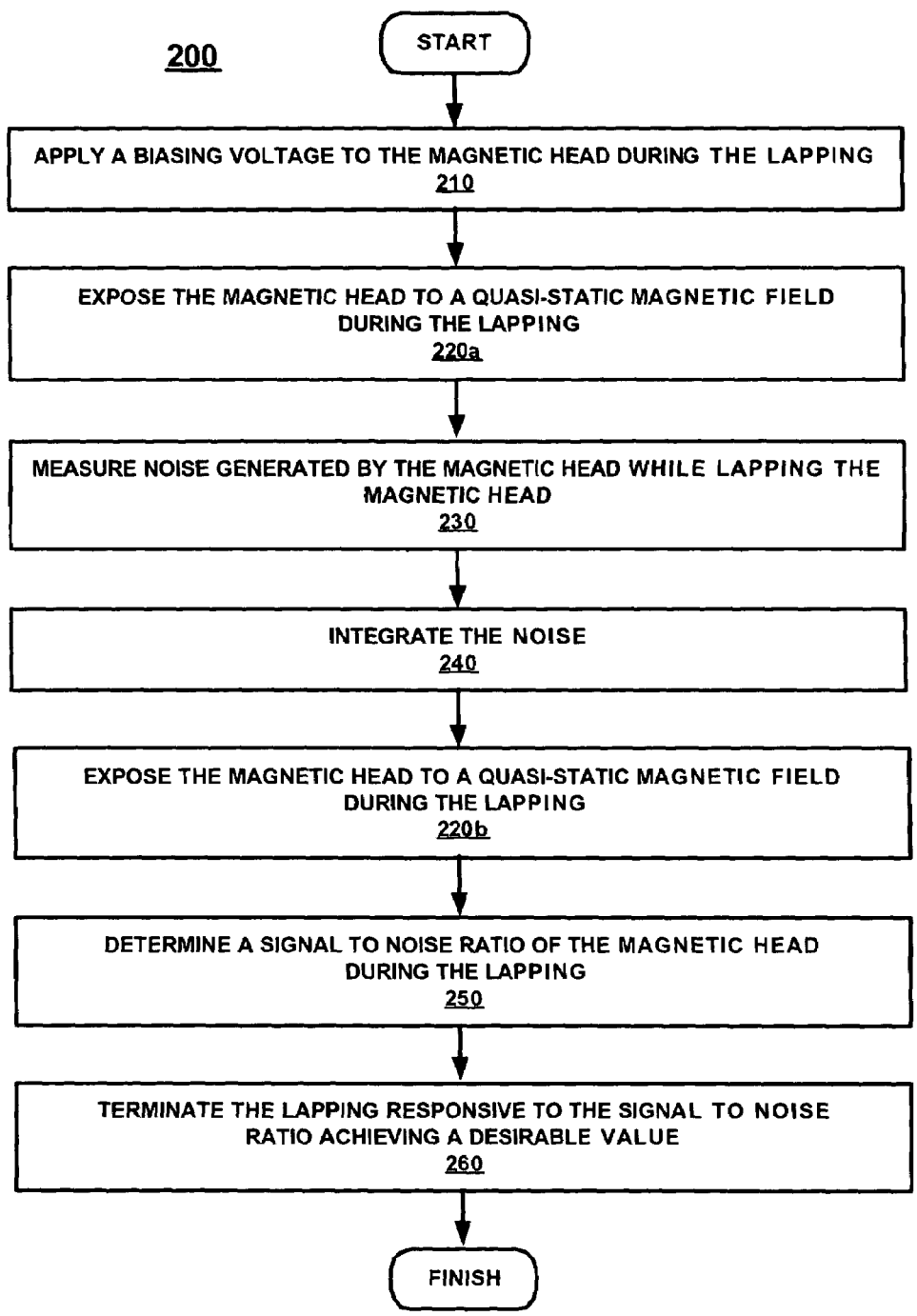
FIG. 2 illustrates a method for manufacturing a magnetic head, in accordance with embodiments of the present invention.

FIG. 2 illustrates a method 200 for manufacturing a magnetic head, in accordance with embodiments of the present invention. In optional 210, a biasing voltage is applied to the magnetic head during a lapping operation. If applied, the bias should be applied prior to a noise measurement operation, e.g., 230. If such a bias is not applied during noise measurement, it is possible that not all noise characteristic of the head will be measured. For example, an unpredictable noise associated with each individual head will not be measured without an applied biasing voltage.

In optional 220a, the magnetic head is exposed to a quasi-static magnetic field during the lapping. Embodiments in accordance with the present invention are well suited to a wide range of frequencies for the quasi-static magnetic field. In general, the quasi-static magnetic field can oscillate at a frequency substantially less than a range of frequencies that head 30 would experience corresponding to reading or writing data in its intended application, e.g., in a hard disk drive. It is to be appreciated that the quasi-static magnetic field can be applied or not applied during the noise measurement, in accordance with embodiments of the present invention. If the quasi-static magnetic field is applied during the noise measurement, a signal induced by the quasi-static magnetic field should be filtered out of the noise signal, e.g., via a 1 kHz high pass filter. If 220a is not utilized, then a quasi-static magnetic field should be generated in 220b. Only one of 220a and 220b is necessary, in accordance with embodiments of the present invention.

In 230, noise generated by the magnetic head while lapping the magnetic head is measured. In optional 240, the noise is integrated.

In optional 250, a signal to noise ratio of the magnetic head during the lapping is determined. In optional 260, the lapping is terminated responsive to the signal to noise ratio achieving a desirable value. In this novel manner, noise generated by a magnetic head can be utilized in the manufacture of such a head, for example to control a manufacturing operation, e.g., lapping the head.

Thus, embodiments of the present invention provide for systems and methods for manufacturing magnetic heads. Additionally, embodiments provide systems and methods for manufacturing magnetic heads that account for unique signal and noise characteristics of individual magnetic heads. Embodiments of the present invention further provide for manufacturing magnetic heads in a manner that is compatible and complimentary with existing magnetic head processing systems and manufacturing processes.

While the method of the embodiment illustrated in flow chart 200 shows specific sequences and quantity of operations, the present invention is suitable to alternative embodiments. For example, not all the operations provided for in the method are required for the present invention. Furthermore, additional operations can be added to the operations presented in the present embodiment. Likewise, the sequences of operations can be modified depending upon the application.

Embodiments in accordance with the present invention, system and method for manufacturing magnetic heads, are thus described. While the present invention has been described in particular embodiments, it should be appreciated that the present invention should not be construed as limited by such embodiments, but rather construed according to the below claims.

What is claimed is:

1. An apparatus for the manufacture of a magnetic head comprising:
   a lapping apparatus for lapping said magnetic head;
   a reference signal generator to generate a target signal to noise ratio for said magnetic head; and
   a feedback control loop coupled to said lapping apparatus and to said reference signal generator to terminate lapping of said magnetic head responsive to achieving said target signal to noise ratio.

2. The apparatus of claim 1 wherein said feedback control loop comprises:
   a noise measurement circuit coupled to said magnetic head for measuring noise generated by said magnetic head during said lapping.

3. The apparatus of claim 2 wherein said feedback control loop comprises:
   a noise integration circuit to integrate noise of said magnetic head.

4. The apparatus of claim 2 wherein said feedback control loop comprises:
   a signal measurement circuit coupled to said magnetic head for measuring a signal generated by said magnetic head during said lapping corresponding to a quasi-static magnetic field.

5. The apparatus of claim 4 wherein said quasi-static magnetic field oscillates at a rate substantially less than a data rate for said magnetic head in an intended application of said magnetic head.

6. The apparatus of claim 4 wherein said feedback control loop comprises:
   signal to noise circuitry coupled to said noise measurement circuit and to said signal measurement circuit for determining a signal to noise ratio of said magnetic head during said lapping.

7. The apparatus of claim 6 wherein said feedback control loop comprises:
   comparator circuitry coupled to said signal to noise circuitry for terminating said lapping.

8. A method of manufacturing a magnetic head, said method comprising:
- lapping said magnetic head; and
- measuring noise generated by said magnetic head during said lapping, wherein said noise is measured over a bandwidth of about 0–50 MHz.

9. The method of claim 8 further comprising:
integrating said noise.

10. The method of claim 9 further comprising:
exposing said magnetic head to a quasi-static magnetic field during said lapping.

11. The method of claim 10 further comprising:
applying a biasing voltage to said magnetic head during said lapping.

12. The method of claim 10 further comprising:
determining a signal to noise ratio of said magnetic head during said lapping.

13. The method of claim 12 further comprising:
terminating said lapping responsive to said signal to noise ratio achieving a desirable value.

14. An apparatus for the manufacture of a magnetic head comprising:
- means for lapping said magnetic head;
- means for exciting said magnetic head with a quasi-static magnetic field;
- means for measuring a signal to noise ratio of said magnetic head; and
- means for terminating said lapping responsive to said signal to noise ratio achieving a desirable value.

15. The apparatus of claim 14 wherein said means for measuring a signal to noise ratio comprises noise means for measuring noise generated by said magnetic head.

16. The apparatus of claim 15 wherein said means for measuring noise comprises means for integrating said noise.

17. The apparatus of claim 15 wherein said means for measuring a signal to noise ratio comprises signal means for measuring a signal corresponding to said quasi-static magnetic field.

18. The apparatus of claim 17 wherein said means for measuring noise comprises said noise means in parallel with said signal means.

19. An apparatus for the manufacture of a magnetic head comprising:
- a lapping apparatus for lapping said magnetic head;
- a voltage source coupled to said magnetic head for biasing said magnetic head during said lapping;
- a magnetic field generator for coupling a quasi-static magnetic field to said magnetic head during said lapping;
- a noise measurement circuit coupled to said magnetic head for measuring noise generated by said magnetic head during said lapping;
- a signal measurement circuit coupled to said magnetic head for measuring signal corresponding to said quasi-static magnetic field generated by said magnetic head during said lapping;
- signal to noise circuitry coupled to said noise measurement circuit and to said signal measurement circuit for determining a signal to noise ratio of said magnetic head during said lapping; and
- comparator circuitry coupled to said signal to noise circuitry for terminating said lapping responsive to said signal to noise ratio achieving a desirable value.

* * * * *